(12) United States Patent
Jitsui

(10) Patent No.: US 12,287,539 B2
(45) Date of Patent: Apr. 29, 2025

(54) ELECTRONIC DEVICE

(71) Applicant: InnoLux Corporation, Miao-Li County (TW)

(72) Inventor: Kazuto Jitsui, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/154,021

(22) Filed: Jan. 12, 2023

(65) Prior Publication Data

US 2023/0168529 A1     Jun. 1, 2023

Related U.S. Application Data

(63) Continuation of application No. 17/104,587, filed on Nov. 25, 2020, now abandoned.

(51) Int. Cl.
| | |
|---|---|
| G02F 1/13 | (2006.01) |
| F21V 8/00 | (2006.01) |
| G02F 1/1335 | (2006.01) |
| G02F 1/1343 | (2006.01) |
| G02F 1/1347 | (2006.01) |
| G02F 1/1368 | (2006.01) |
| G02F 1/139 | (2006.01) |

(52) U.S. Cl.
CPC ......... *G02F 1/1323* (2013.01); *G02B 6/0041* (2013.01); *G02B 6/0051* (2013.01); *G02F 1/133528* (2013.01); *G02F 1/134363* (2013.01); *G02F 1/13471* (2013.01); *G02F 1/1368* (2013.01); *G02F 1/1393* (2013.01)

(58) Field of Classification Search
None
See application file for complete search history.

(56) References Cited

U.S. PATENT DOCUMENTS

| | | |
|---|---|---|
| 2005/0286000 A1 | 12/2005 | Tsai et al. |
| 2006/0109396 A1* | 5/2006 | Tsai ............. G02F 1/1323 349/65 |
| 2009/0040772 A1 | 2/2009 | Laney |
| 2010/0103148 A1 | 4/2010 | Okazaki et al. |
| 2010/0128208 A1 | 5/2010 | Kurasawa |
| 2010/0188617 A1 | 7/2010 | Sakai et al. |
| 2011/0128471 A1 | 6/2011 | Suckling et al. |
| 2011/0310085 A1 | 12/2011 | Mimura et al. |

(Continued)

FOREIGN PATENT DOCUMENTS

| | | |
|---|---|---|
| CN | 101206331 A | 6/2008 |
| CN | 100451753 C | 1/2009 |

(Continued)

*Primary Examiner* — Shan Liu
(74) *Attorney, Agent, or Firm* — MUNCY, GEISSLER, OLDS & LOWE, P.C.

(57) ABSTRACT

An electronic device includes: a non-collimated backlight module; a transparent backlight module disposed on the non-collimated backlight module, wherein the transparent backlight module includes a direct-lit backlight module or an edge-lit backlight module; and a display cell disposed on the transparent backlight module; wherein when in a narrow mode, the non-collimated backlight module is in an off-state, and the transparent backlight module is in an on-state, wherein when in a wide mode, the non-collimated backlight module is in an on-state.

7 Claims, 8 Drawing Sheets

(56) References Cited

U.S. PATENT DOCUMENTS

| | | | |
|---|---|---|---|
| 2012/0235891 A1* | 9/2012 | Nishitani | G02F 1/1323 345/102 |
| 2016/0071884 A1 | 3/2016 | Miyamoto et al. | |
| 2016/0093255 A1 | 3/2016 | Aoki et al. | |
| 2016/0097943 A1 | 4/2016 | Mimura et al. | |
| 2016/0356943 A1 | 12/2016 | Choi et al. | |
| 2016/0357046 A1 | 12/2016 | Choi et al. | |
| 2017/0351152 A1 | 12/2017 | Hashiguchi et al. | |
| 2018/0299726 A1 | 10/2018 | Oka et al. | |
| 2019/0353943 A1 | 11/2019 | Smith et al. | |
| 2019/0353944 A1* | 11/2019 | Acreman | G02F 1/137 |
| 2020/0057343 A1 | 2/2020 | Epstein et al. | |
| 2020/0249504 A1* | 8/2020 | Hopkin | G09G 3/3426 |
| 2022/0163828 A1 | 5/2022 | Jitsui | |

FOREIGN PATENT DOCUMENTS

| | | |
|---|---|---|
| CN | 101427177 A | 5/2009 |
| CN | 103913912 A | 7/2014 |
| CN | 110501824 A | 11/2019 |

\* cited by examiner

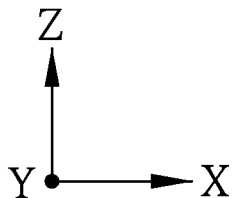
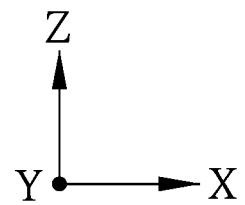
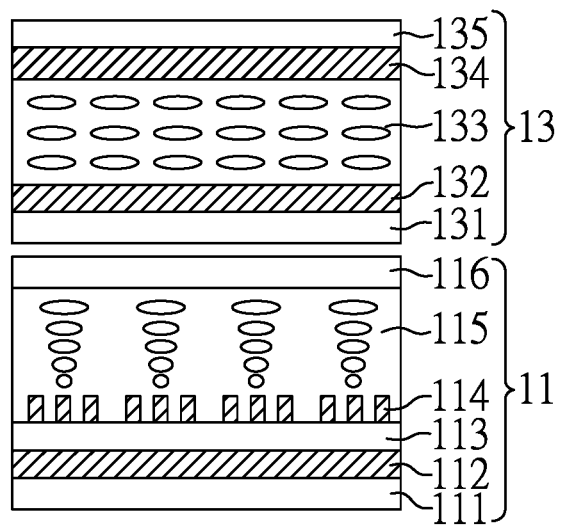
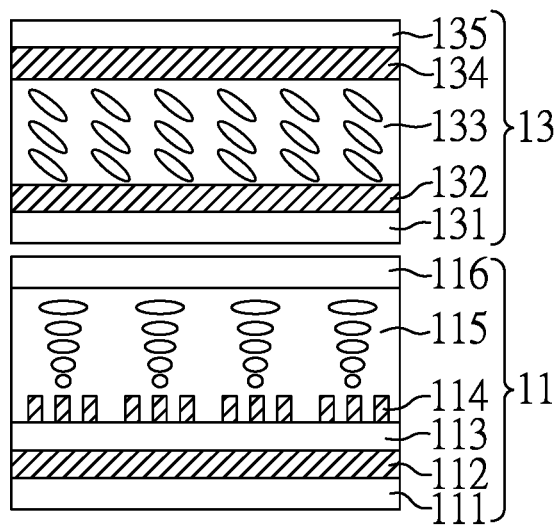
FIG. 2A  FIG. 2B

ELECTRONIC DEVICE

CROSS REFERENCE TO RELATED APPLICATION

This application is a continuation (CA) of U.S. patent application for "Electronic device", U.S. application Ser. No. 17/104,587 filed Nov. 25, 2020, and the subject matter of which is incorporated herein by reference.

BACKGROUND

1. Field

The present disclosure relates to an electronic device. More specifically, the present disclosure relates to a privacy electronic device.

2. Description of Related Art

Recently, a privacy display device is developed for several usages, such as automotive displays, Notebook displays, PC monitors, ATM displays, etc. Requirement of the privacy display device depends on the product. In addition, some privacy display devices are required to have the function of switching between the wide mode (i.e. the public mode) and the narrow mode (i.e. the privacy mode).

However, the currently used privacy display devices have some disadvantages. For example, the brightness of the display devices at the wide viewing angle is not low enough, and other people near to the user may feel annoyed.

Therefore, it is desirable to provide a novel privacy electronic device to improve the disadvantages of the privacy display devices currently used.

SUMMARY

The present disclosure provides an electronic device, comprising: a non-collimated backlight module; a transparent backlight module disposed on the non-collimated backlight module, wherein the transparent backlight module comprises a direct-lit backlight module or an edge-lit backlight module; and a display cell disposed on the transparent backlight module; wherein when in a narrow mode, the non-collimated backlight module is in an off-state, and the transparent backlight module is in an on-state, wherein when in a wide mode, the non-collimated backlight module is in an on-state.

Other novel features of the disclosure will become more apparent from the following detailed description when taken in conjunction with the accompanying drawings.

BRIEF DESCRIPTION OF THE DRAWINGS

FIG. 2A is a schematic cross-sectional view of a display cell and a second light adjusting unit of an electronic device shown in FIG. 1 in a wide mode.

FIG. 2B is a schematic cross-sectional view of a display cell and a second light adjusting unit of an electronic device shown in FIG. 1 in a narrow mode.

DETAILED DESCRIPTION OF EMBODIMENT

Figure 1:
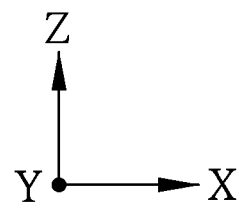
FIG. 1 is a schematic cross-sectional view of an electronic device according to one embodiment of the present disclosure.
Figure 1:
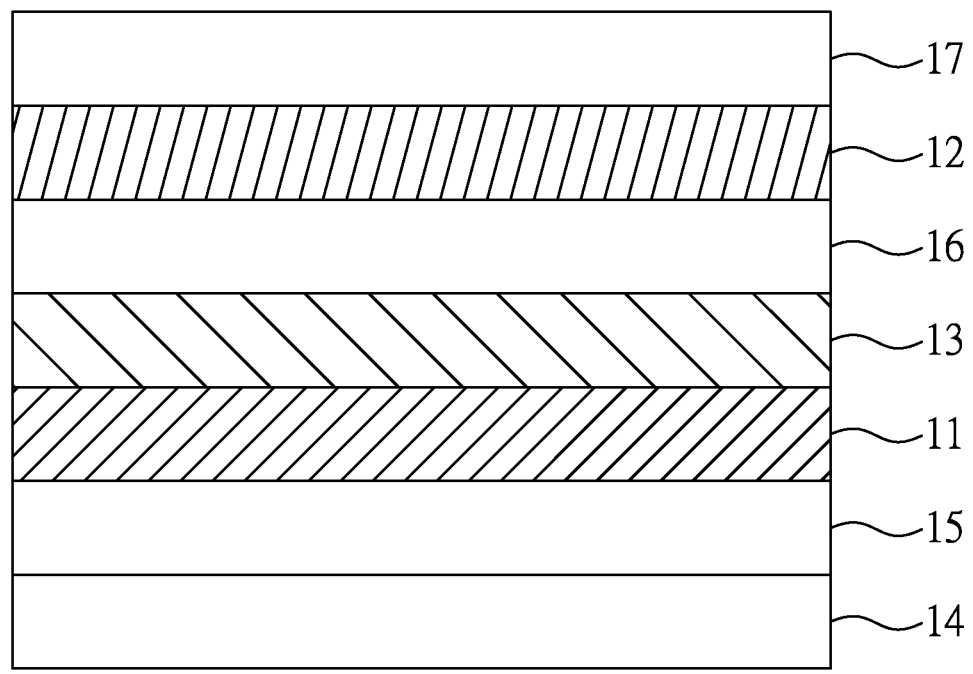

Different embodiments of the present disclosure are provided in the following description. These embodiments are meant to explain the technical content of the present disclosure, but not meant to limit the scope of the present disclosure. A feature described in an embodiment may be applied to other embodiments by suitable modification, substitution, combination, or separation.

It should be noted that, in the present specification, when a component is described to comprise an element, it means that the component may comprise one or more of the elements, and it does not mean that the component has only one of the element, except otherwise specified.

Moreover, in the present specification, the ordinal numbers, such as "first" or "second", are used to distinguish a plurality of elements having the same name, and it does not means that there is essentially a level, a rank, an executing order, or an manufacturing order among the elements, except otherwise specified. A "first" element and a "second" element may exist together in the same component, or alternatively, they may exist in different components, respectively. The existence of an element described by a greater ordinal number does not essentially means the existence of another element described by a smaller ordinal number.

In the present specification, except otherwise specified, the feature A "or" or "and/or" the feature B means the existence of the feature A, the existence of the feature B, or the existence of both the features A and B. The feature A "and" the feature B means the existence of both the features A and B. The term "comprise(s)", "comprising", "include(s)", "including", "have", "has" and "having" means "comprise(s)/comprising but is/are/being not limited to".

Moreover, in the present specification, the terms, such as "top", "upper", "bottom", "front", "back", or "middle", as well as the terms, such as "on", "above", "over", "under", "below", or "between", are used to describe the relative positions among a plurality of elements, and the described relative positions may be interpreted to include their translation, rotation, or reflection.

Furthermore, the terms recited in the specification and the claims such as "above", "over", or "on" are intended not only directly contact with the other element, but also intended indirectly contact with the other element. Similarly, the terms recited in the specification and the claims such as "below", or "under" are intended not only directly contact with the other element but also intended indirectly contact with the other element.

Furthermore, the terms recited in the specification and the claims such as "connect" is intended not only directly connect with other element, but also intended indirectly connect and electrically connect with other element.

Furthermore, when a value is in a range from a first value to a second value, the value may be the first value, the second value, or another value between the first value and the second value.

Moreover, in the present specification, a value may be interpreted to cover a range within ±20% of the value, and in particular, a range within ±10%, ±5%, ±3%, ±2%, ±1% or ±0.5% of the value, except otherwise specified. The value provided in the present specification is an approximate value, which means the meaning "about" is also included in the present disclosure without specifically specifying "about".

In the present specification, except otherwise specified, the terms (including technical and scientific terms) used herein have the meanings generally known by a person skilled in the art. It should be noted that, except otherwise specified in the embodiments of the present disclosure, these terms (for example, the terms defined in the generally used dictionary) should have the meanings identical to those known in the art, the background of the present disclosure or the context of the present specification, and should not be read by an ideal or over-formal way.

Hereinafter, the term "narrow mode" refers to the privacy mode, and the images displayed on the electronic device may be seen within, for example, 25 degrees of the viewing angle, and the ranges within ±10 degrees or ±5 degrees of 25 degrees are also included in the scope of the present disclosure. The term "wide mode" refers to the public mode, and the images displayed on the electronic device may be seen within, for example, near to 90 degrees (for example, 80 degrees) of the viewing angle. The term "low contrast ratio (CR)" means a function that the contrast ratio is ranged from 0.2 to 5. The term "dark" means a function that the brightness of the electronic device is 2% of the maximum brightness of grayscale.

The term "viewing angle" can be defined by the followings. A direction perpendicular to a surface of a side of the electronic device near to the user (i.e. the display side) is defined. A first virtual line is defined, which is substantially parallel to the direction and is a line connecting the eyes of the user and the center (or a point close to the center within a tolerable deviation; or a point which is on the central line of the display side; wherein the central line may be substantially parallel to one side edge of the display side) of the display side of the electronic device. When the user moves (for example, along a moving direction parallel to the display side), a second virtual line is defined, which is a line connecting the center (or a point close to the center within a tolerable deviation) of the display side of the electronic device and the position of the eyes of the user that the user still can see the images displayed by the electronic device. The angle included between the first virtual line and the second virtual line is defined as the viewing angle.

The electronic device of the present disclosure may comprise a display device, an antenna device, a sensing device, a touch device, a curved electronic device or a free shape display device, but the present disclosure is not limited thereto. The electronic device of the present disclosure may be a bendable or a flexible display device. The display device may include, for example, a tiled display device, but the present disclosure is not limited thereto. The electronic device of the present disclosure may be a combination of the aforesaid devices, but the present disclosure is not limited thereto. In addition, the shapes of the electronic device of the present disclosure is not particularly limited, and may be rectangle, circular, polygon, a shape with curved edges or other suitable shapes, but the present disclosure is not limited thereto. The electronic device of the present disclosure may comprise a driving system, a control system, a light source system, a shelving system or other peripheral system to support the display device or the tiled display device. Hereinafter, a display device is used as an example to illustrate the electronic device of the present disclosure, but the present disclosure is not limited thereto.

FIG. 1 is a schematic cross-sectional view of an electronic device according to one embodiment of the present disclosure. The electronic device of the present embodiment comprises: a display cell 11; a first light adjusting unit 12; and a second light adjusting unit 13, wherein the display cell 11, the first light adjusting unit 12 and the second light adjusting unit 13 are at least partially overlapped.

Herein, the display cell 11 is for displaying images. In an embodiment, the display cell 11 may be a liquid crystal cell, but the present disclosure is not limited thereto. In detail, the display cell 11 may include two substrates, liquid crystal, plural pixels and a color filter, wherein the liquid crystal, plural pixels and the color filter are disposed between the two substrates. The driving mode of the liquid crystal of display cell 11 is not particularly limited. For example, the driving mode of the liquid crystal may be an in-plane switching (IPS) mode, a fringe field switching (FFS) mode, a vertical alignment (VA) mode, a twisted nematic (TN) mode, an electrically-controlled birefringence (ECB) mode or an optically compensated birefringence (OCB) mode; but the present disclosure is not limited thereto. In some embodiments, the display cell 11 may be a self-luminance display cell, including plural pixels which may produce different colors. For example, the plural pixels may include an organic light emitting diode (OLED), an inorganic light emitting diode (ILED), a mini-LED, a micro-LED, quantum dots (QDs), a quantum dot diode (QLED/QDLED), an electrophoresis, fluorescence, phosphor, other suitable materials or a combination of the above materials, but the disclosure is not limited thereto.

In addition, at least one of the first light adjusting unit 12 and the second light adjusting unit 13 is an ECB mode liquid crystal cell. In some embodiments, the first light adjusting unit 12 may be an ECB mode liquid crystal cell, a TN mode liquid crystal cell, a VA mode liquid crystal cell, or a VA-ECB hybrid mode liquid crystal cell.

Furthermore, the second light adjusting unit 13 may be an ECB mode liquid crystal cell.

The electronic device of the present embodiment comprises: a first polarizer 15 and a second polarizer 16, wherein the display cell 11 and the second light adjusting unit 13 are disposed between the first polarizer 15 and the second polarizer 16, and the second light adjusting unit 13 is disposed on the display cell 11. Thereby, the relative position of the first polarizer 15, the second polarizer 16, the second light adjusting unit 13 and the display cell 11 described above may have the a low CR (contrast ratio) function. In some embodiments, the amount and the positions of the polarizers may be adjusted according to the need. In addition, other optical films such as prism sheets, diffusors or bright enhancement films may also be included in the electronic device of the present disclosure if it is needed.

The electronic device of the present embodiment further comprises: a third polarizer 17, wherein the first light adjusting unit 12 is disposed between the second polarizer 16 and the third polarizer 17. Herein, the relative position of the first polarizer 15, the second polarizer 16, the third polarizer 17, the display cell 11, the first light adjusting unit 12 and the second light adjusting unit 13 is shown as FIG. 1, thereby the electronic device may have the low contrast ratio function and dark function at the same time in the narrow mode. In another embodiment of the present disclosure, two different polarizers may be used as the second polarizers, one is disposed on and adjacent to the second light adjusting unit 13 and the other one is disposed under and adjacent to the first light adjusting unit 12. In this embodiment, relative position of the one polarizer mentioned above, the second light adjusting unit 13, the display cell 11 and the first polarizer 15 may have the low contrast ratio function in the narrow mode. The relative position of the other one polarizer mentioned above, the first light adjusting unit 12 and the third polarizer 17 may have dark function in the narrow mode, but the present disclosure is not limit thereto.

For the dark function, in the wide mode, no liquid crystal retardation is occurred at all viewing angle, so the image displayed by the display cell 11 can be seen from all viewing angle. In the narrow mode, no or little liquid crystal retardation is occurred at the on-axis or at the user viewing angle (for example, within 25 degrees), but significant liquid crystal retardation is occurred at the off-axis or at the viewing angle outside the user viewing angle (for example, more than 25 degrees). Thus, the image displayed by the display cell 11 can be seen from the user viewing angle but cannot be seen from the viewing angle outside the user viewing angle.

In the electronic device of the present embodiment, the first polarizer 15, the second polarizer 16 and the third polarizer 17 may respectively be any retardation film, for example, an A-plate, a C-plate, an O-film a discotic LC film, or a combination thereof; but the present disclosure is not limited thereto. In addition, the first polarizer 15, the second polarizer 16 and the third polarizer 17 may be the same or different from each other.

As mentioned above, the electronic device of the present embodiment of the present embodiment is a combination of the low CR function and the dark function. In the case that the electronic device is in the narrow mode, the images displayed by the display cell 11 can be visible at user viewing angle (for example, within 25 degrees); but the images displayed by the display cell 11 is invisible at the narrow viewing angle (for example, in a range from 25 degrees to 40 degrees) due to the low CR and also invisible at the wide viewing angle (for example, in a range from 40 degrees to 80 degrees) due to the low CR and enough darkness. In particular, the brightness of the electronic device at the wide viewing angle is low, so a person near to the user may not be disturbed when the electronic device is in the narrow mode. The ranges within ±5 degrees or ±10 degrees of the viewing angles described herein are still included in the scope of the present disclosure due to the design or the process error of the electronic device.

The electronic device of the present embodiment has both the dark function and the low CR function, so the brightness at the viewing angle outside the user viewing angle is low enough when the electronic device is in the narrow mode. Thus, a person adjacent to the user cannot see the images displayed on the electronic device, or the person is not disturbed by the electronic device due to the insufficient darkness.

As shown in FIG. 1, in the electronic device of the present embodiment, the second light adjusting unit 13 is disposed on the display cell 11, the first light adjusting unit 12 is disposed on the second light adjusting unit 13, the second light adjusting unit 13 and the display cell 11 is disposed between the first polarizer 15 and the second polarizer 16 and the first light adjusting unit 12 disposed between the second polarizer 16 and the third polarizer 17.

In another embodiment of the present disclosure, the second light adjusting unit 13 and the display cell 11 may be disposed between the second polarizer 16 and the third polarizer 17, and the second light adjusting unit 13 is disposed on the display cell 11. The first light adjusting unit 12 is disposed between the first polarizer 15 and the second polarizer 16. Hence, the second light adjusting unit 13 and the display cell 11 are disposed on the first light adjusting unit 12. Thereby, the relative position of the second polarizer 16, the display cell 11, the second light adjusting unit 13 and the third polarizer 17 may have the low CR function. The relative position of the first polarizer 15, the second polarizer 16, the third polarizer 17, the display cell 11, the first light adjusting unit 12 and the second light adjusting unit 13 described in this embodiment may have the low contrast ratio function and dark function at the same time in the narrow mode. However, the present disclosure is not limited thereto.

Furthermore, the electronic device of the present embodiment may further selectively comprise a backlight module 14, disposed under the display cell 11, the first light adjusting unit 12 and the second light adjusting unit 13. In some embodiments, the backlight module 14 may be a direct-lit backlight module or an edge-lit backlight module, but the present disclosure is not limited thereto.

FIG. 2A and FIG. 2B are respectively schematic cross-sectional views of the display cell and the second light adjusting unit shown in FIG. 1 in a wide mode and in a narrow mode. Herein, for example, the driving mode of the liquid crystal of the display cell 11 may be an IPS mode. However, the present disclosure is not limited thereto, and any driving mode of the liquid crystal may be used in the present disclosure. In addition, the second light adjusting unit 13 may be used an ECB mode.

As shown in FIG. 2A and FIG. 2B, the display cell 11 comprises: a first substrate 111; a second substrate 116 opposite to the first substrate 111; a common electrode 112 disposed on the first substrate 111; an insulating layer 113 disposed on the common electrode 112; a pixel electrode 114 disposed on the insulating layer 113; and a first display medium layer 115 disposed between the first substrate 111 and the second substrate 116. Herein, plural transistors (not shown in the figure) electrically connected to the pixel electrode 114 are disposed on the first substrate 111. The common electrode 112 may be a planer electrode, and the pixel electrode 114 may be a patterned electrode, but the present disclosure is not limited thereto. Even not shown in the figure, in some embodiments, the display cell 11 may selectively comprise a color filter layer and a black matrix layer respectively formed on the first substrate 111 or the second substrate 116. In addition, the first display medium layer 115 may be a liquid crystal layer, but the present disclosure is not limited thereto.

The second light adjusting unit 13 comprises: a third substrate 131; a fourth substrate 135 opposite to the third substrate 131; a first electrode 132 disposed on the third substrate 131; a second electrode 134 disposed on the fourth substrate 135; and a second display medium layer 133 disposed between the third substrate 131 and the fourth substrate 135. The first electrode 132 and the second electrode 134 may be respectively a planer electrode, but the present disclosure is not limited thereto. In some embodiment, the second display medium layer 133 may be a liquid crystal layer, but the present disclosure is not limited thereto. In addition, an alignment layer may be disposed between the second display medium layer 133 and the second electrode 134; and another alignment layer may be disposed between the second display medium layer 133 and the first electrode 132.

As shown in FIG. 2A, when the electronic device is in a wide mode, there is no voltage difference between the first electrode 132 and the second electrode 134. For example, in one embodiment, no voltage is applied to the first electrode 132 and the second electrode 134. In another embodiment, same voltage is applied to the first electrode 132 and the second electrode 134. However, the present disclosure is not limited thereto. As shown in FIG. 2B, when the electronic device is in a narrow mode, there is a voltage difference between the first electrode 132 and the second electrode 134. In one embodiment, no voltage is applied to the first electrode 132 and a predetermined voltage is applied to the second electrode 134. In another embodiment, a predetermined voltage is applied to the first electrode 132 and no voltage is applied to the second electrode 134. In further another embodiment, different voltage is applied to the first electrode 132 and the second electrode 134. However, the present disclosure is not limited thereto.

Herein, the voltage difference may cause the liquid crystal molecules in the display medium layer 133 rotates, the rotation of the liquid crystal molecules may not influence the brightness of the second light adjusting unit 13 at the user viewing angle (for example, within 25 degrees) but causes the brightness increased at the narrow viewing angle (for example, in a range from 25 degrees to 40 degrees) and wide viewing angle (for example, in a range from 40 degrees to 80 degrees). Thus, the purpose of low CR at the narrow viewing angle and wide viewing angles can be achieved.

Figure 3:
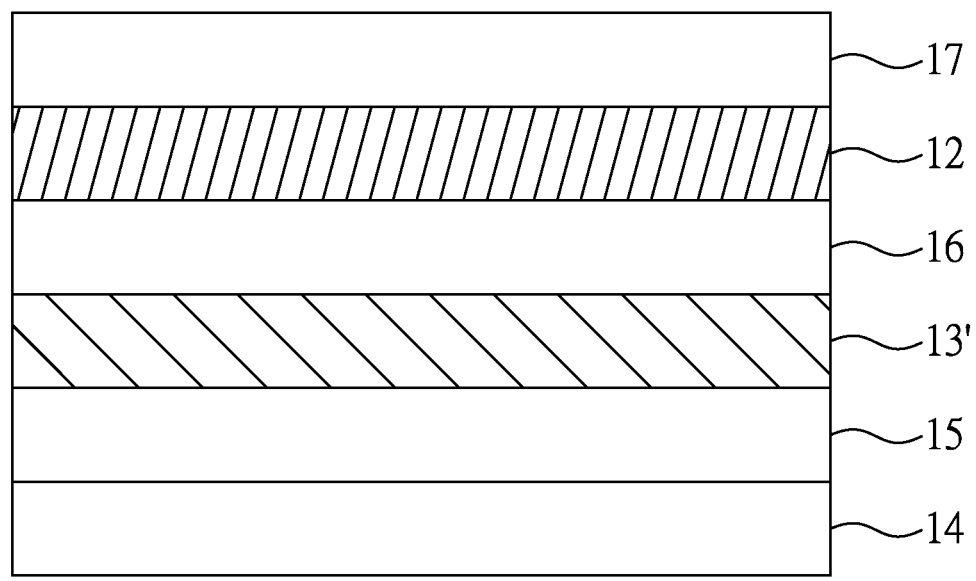
FIG. 3 is a schematic cross-sectional view of an electronic device according to another embodiment of the present disclosure.
Figure 4A:
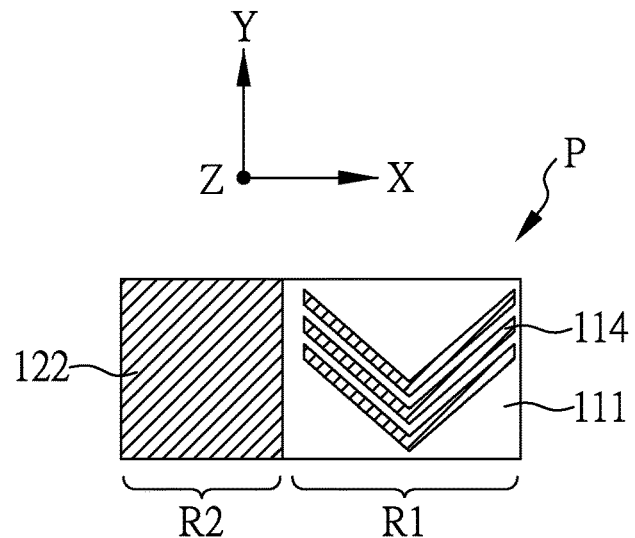
FIG. 4A is a schematic top view of a pixel of an electronic device of FIG. 3.

FIG. 3 is a schematic cross-sectional view of an electronic device according to another embodiment of the present disclosure, and FIG. 4A is a schematic top view of a pixel of an electronic device of FIG. 3. The electronic device of the present embodiment comprises: a first light adjusting unit 12; and a second light adjusting unit 13' comprising plural pixels P, wherein at least one of the plural pixels P comprises a display region R1 and a viewing angle changing region R2, and an operation mode of the display region R1 is different from an operation mode of the viewing angle changing region R2. The difference between the electronic devices shown in FIG. 1 and FIG. 3 is that the electronic device of FIG. 1 comprises the display cell 11 and the second light adjusting unit 13, but the electronic device of FIG. 3 comprises the second light adjusting unit 13' with pixels P. Thus, the second light adjusting unit 13' of the present embodiment can be considered as a display cell with light adjusting function.

The electronic device of the present embodiment further comprises: a first polarizer 15 and a second polarizer 16, wherein the second light adjusting unit 13' is disposed between the first polarizer 15 and the second polarizer 16.

The electronic device of the present embodiment further comprises: a third polarizer 17, wherein the first light adjusting unit 12 is disposed between the second polarizer 16 and the third polarizer 17.

Furthermore, the electronic device of the present embodiment may further selectively comprise a backlight module 14, disposed under the first light adjusting unit 12 and the second light adjusting unit 13'. In some embodiments, the backlight module 14 may be a direct-lit backlight module or an edge-lit backlight module, but the present disclosure is not limited thereto.

The first polarizer 15, the second polarizer 16, the third polarizer 17 and the backlight module 14 are similar to those illustrated above, and are not repeated again.

Figures 4B, 4C:
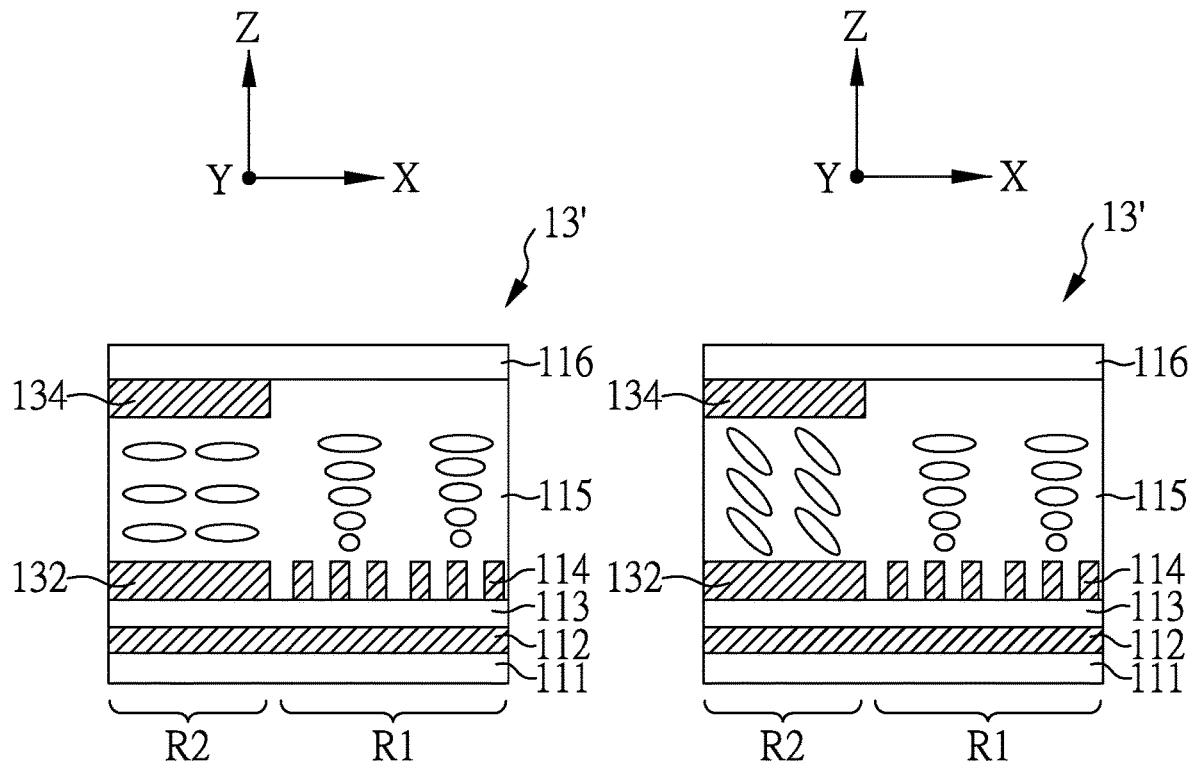
FIG. 4B is a schematic cross-sectional view of a second light adjusting unit of an electronic device shown in FIG. 3 in a wide mode.
FIG. 4C is a schematic cross-sectional view of a second light adjusting unit of an electronic device shown in FIG. 3 in a narrow mode.

As shown in FIG. 4A, the liquid crystal molecules in the display region R1 may be driven by an IPS mode, and liquid crystal molecules in the viewing angle changing region R2 may be driven by an ECB mode. In another embodiment of the present disclosure, self-luminance display medium may be used in the display region R1. However, the present disclosure is not limited thereto. FIG. 4B and FIG. 4C are respectively cross-sectional views of the second light adjusting unit 13' shown in FIG. 3 in a wide mode and in a narrow mode.

As shown in FIG. 4A to FIG. 4C, the second light adjusting unit 13' comprises: a first substrate 111; a second substrate 116 opposite to the first substrate 111; a common electrode 112 disposed on the first substrate 111; an insulating layer 113 disposed on the common electrode 112; a pixel electrode 114 disposed on the insulating layer 113; and a first display medium layer 115 disposed between the first substrate 111 and the second substrate 116. Herein, the pixel electrode 114 is disposed in the display region R1 of the pixel P, but is not disposed in the viewing angle changing region R2 of the pixel P. Herein, plural transistors (not shown in the figure) electrically connected to the pixel electrode 114 are disposed on the first substrate 111. The common electrode 112 is a planer electrode, and the pixel electrode 114 is a patterned electrode. Even not shown in the figure, in some embodiments, the display cell 11 may selectively comprise a color filter layer and a black matrix layer respectively formed on the first substrate 111 or the second substrate 116. In addition, the first display medium layer 115 may be a liquid crystal layer, but the present disclosure is not limited thereto. In some embodiments, the shape or design of the pixel electrode 114 can be adjusted according to actual needs, not limited to FIG. 4A.

The second light adjusting unit 13' further comprises: a first electrode 132 disposed on the insulating layer 113, wherein the pixel electrode 114 and the first electrode 132 may be formed by the same layer; and a second electrode 134 disposed on the second substrate 116, wherein the first display medium layer 115 is disposed between the first electrode 132 and the second electrode 134. Herein, the first electrode 132 and the second electrode 134 are disposed in the viewing angle changing region R2 of the pixel P, but are not disposed in the display region R1 of the pixel P. The first electrode 132 and the second electrode 134 may be respectively a planer electrode, but the present disclosure is not limited thereto.

In addition, an alignment layer is disposed between the pixel electrode 114 and the first display medium layer 115, and also between the first electrode 132 and the first display medium layer 115. Another alignment layer is disposed between the second electrode 134 and the first display medium layer 115. The rubbing direction of the alignment layer on the pixel electrode 114 and the first electrode 132 is homogeneous. The rubbing direction of the alignment layer on the pixel electrode 114 and the first electrode 132 is different from (for example, opposite to) the rubbing direction of the alignment layer on the second electrode 134.

As shown in FIG. 4B, when the electronic device is in the wide mode, there is no voltage difference between the first electrode 132 and the second electrode 134. For example, no voltage is applied to the first electrode 132 and the second electrode 134, but the present disclosure is not limited thereto. Thus, the viewing angle changing region R2 is dark at all viewing angle, and the image displayed by the display region R1 can be observed by anyone at all viewing angle. As shown in FIG. 4C, when the electronic device is in the narrow mode, there is a voltage difference between the first electrode 132 and the second electrode 134. For example, no voltage is applied to the second electrode 134 and a predetermined voltage is applied to the first electrode 132, but the present disclosure is not limited thereto. Herein, the voltage difference may cause the liquid crystal molecules in the first display medium layer 115 rotates, the rotation of the liquid crystal molecules may not influence the brightness of the viewing angle changing region R2 of the second light adjusting unit 13' at the user viewing angle (for example, within 25 degrees) but causes the brightness of the viewing angle changing region R2 increased at the narrow viewing angle (for example, in a range from 25 degrees to 40 degrees) and wide viewing angle (for example, in a range from 40 degrees to 80 degrees). Thus, the image displayed by the display region R1 may be observed by the user at the user viewing angle but may not be observed by a person at the narrow and wide viewing angles due to low CR.

Herein, the relative position of the first polarizer 15, the second polarizer 16, the third polarizer 17, the first light adjusting unit 12 and the second light adjusting unit 13' is shown as FIG. 3, thereby the electronic device may have the low contrast ratio function and dark function at the same time in the narrow mode.

Figure 5:
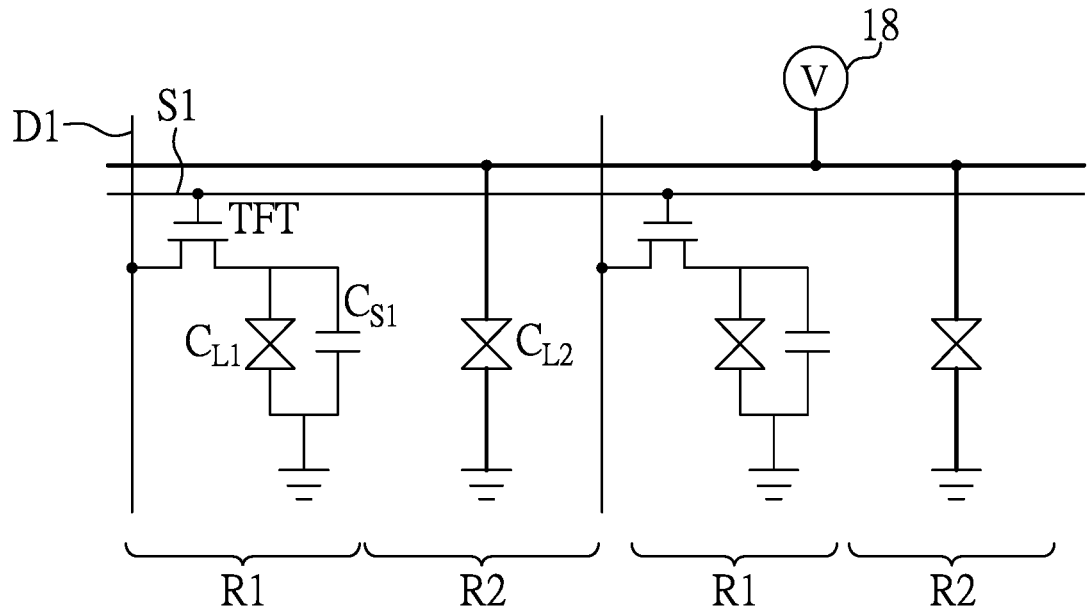
FIG. 5 is a circuit diagram of pixels of a second light adjusting unit shown in FIG. 3 in one embodiment of the present disclosure.

FIG. 5 is a circuit diagram of pixels of a second light adjusting unit shown in FIG. 3 in one embodiment of the present disclosure. As shown in FIG. 4B and FIG. 5, a voltage source 18 is electrically connected to the first electrode 132 or the second electrode 134 in the viewing angle changing region R2. In the wide mode, the voltage source 18 does not provide a voltage to the first electrode 132 or the second electrode 134. Thus, in the wide mode, the viewing angle changing region R2 is dark at all viewing angle. In the narrow mode, the voltage source 18 provides a predetermined voltage to the first electrode 132 or the second electrode 134. Thus, in the narrow mode, the viewing angle changing region R2 is in a bright state and the purpose of low CR can be achieved. Herein, in the narrow mode, the CR of the second light adjusting unit 13' can be calculated by the following equation (I), wherein R1 means the display region R1 and R2 means the viewing angle changing region R2:

CR=(Brightness of R1 in the bright state+Brightness of R2 in the bright state)/(Brightness of R1 in the dark state+Brightness of R2 in the bright state)   (I).

In addition, as shown in FIG. 5, at least one TFT is disposed in the display region R1, wherein a control end of the TFT is electrically connected to a first scan line S1, a first end of the TFT is electrically connected to a first data line D1, and a second end of the TFT is electrically connected to the capacitor $C_{L1}$ of the first display medium layer 115 which is in the display region R1. A first end of a storage capacitor $C_{S1}$ is electrically connected to a first end of the capacitor $C_{L1}$, and a second end of the storage capacitor $C_{S1}$ and a second end of the capacitor $C_{L2}$ are connected to the ground. Furthermore, in the viewing angle changing region R2, an end of the capacitor $C_{L2}$ of the first display medium layer 115 (or the capacitor between first electrode 132 and the second electrode 134) is electrically connected to the voltage source 18, and another end of the capacitor $C_{L2}$ is connected to the ground.

Figure 6:
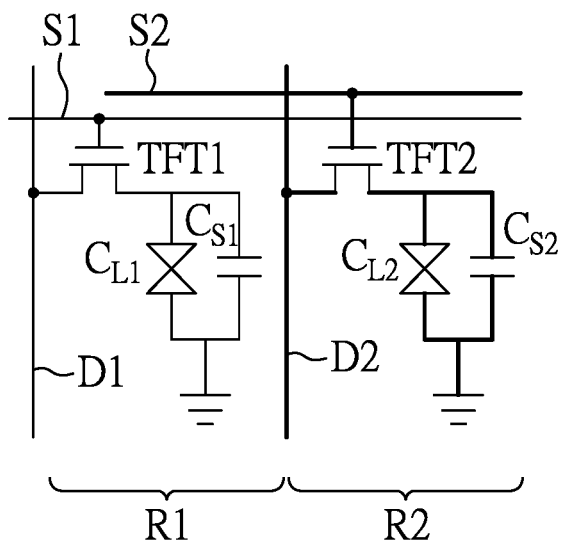
FIG. 6 is a circuit diagram of a pixel of a second light adjusting unit shown in FIG. 3 in another embodiment of the present disclosure.

FIG. 6 is a circuit diagram of pixels of a second light adjusting unit shown in FIG. 3 in one embodiment of the present disclosure. As shown in FIG. 4B and FIG. 6, an alignment of liquid crystal molecules in the display region R1 are controlled by a first transistor TFT1, and an alignment of liquid crystal molecules in the viewing angle changing region R2 are controlled by a second transistor TFT2. More specifically, the second light adjusting unit 13' (as shown in FIG. 3) further comprises a first scan line S1, a first data line D1, a second scan line S2 and a second data line D2, the first transistor TFT1 is electrically connected to the first scan line S1 and the first data line D1, and the second transistor TFT2 is electrically connected to the second scan line S2 and the second data line D2. Thus, the brightness of the display region R1 and the viewing angle changing region R2 are respectively controlled by the first transistor TFT1 and the second transistor TFT2. As shown in FIG. 4B and FIG. 6, the capacitor $C_{L1}$ of the first display medium layer 115 is electrically connected to the first transistor TFT1, and the capacitor $C_{L2}$ of the first display medium layer 115 (or the capacitor between first electrode 132 and the second electrode 134) is electrically connected to the second transistor TFT2.

In the wide mode, no voltage is provided to the first electrode 132 and/or the second electrode 134. Thus, in the wide mode, the viewing angle changing region R2 is dark at all viewing angle. In the narrow mode, a predetermined voltage is provided to the first electrode 132 or the second electrode 134, so a voltage difference may be formed between the first electrode 132 and the second electrode 134 and the viewing angle changing region R2 is in the bright state. Thus, the purpose of low CR in the narrow mode can be achieved, and the CR can be close to 0.2 to 5. Herein, in the narrow mode, the CR of the second light adjusting unit 13' can be calculated by the following equation (II), wherein R1 means the display region R1 and R2 means the viewing angle changing region R2:

CR=(Brightness of R1 in the bright state+Brightness of R2 in the dark state)/(Brightness of R1 in the dark state+Brightness of R2 in the bright state)   (II).

Figure 7:
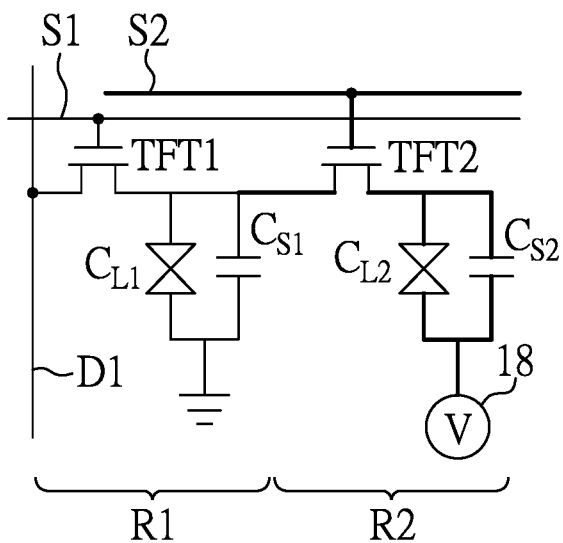
FIG. 7 is a circuit diagram of a pixel of a second light adjusting unit shown in FIG. 3 in further another embodiment of the present disclosure.

FIG. 7 is a circuit diagram of pixels of a second light adjusting unit shown in FIG. 3 in one embodiment of the present disclosure. The circuit diagram shown in FIG. 7 is similar to that shown in FIG. 6, except for the following difference. In FIG. 6, the second transistor TFT2 is electrically connected to the second scan line S2 and the second data line D2. In FIG. 7, the second light adjusting unit 13' (as shown in FIG. 3) further comprises a first scan line S1, a first data line D1 and a second scan line S2, the first transistor TFT1 is electrically connected to the first scan line S1 and the first data line D1, and the second transistor TFT2 is electrically connected to the second scan line S2 and the first data line D1. As shown in FIG. 4B and FIG. 7, the capacitor $C_{L1}$ of the first display medium layer 115 is electrically connected to the first transistor TFT1, and the capacitor $C_{L2}$ of the first display medium layer 115 (or the capacitor between first electrode 132 and the second electrode 134) is electrically connected to the second transistor TFT2.

Furthermore, as shown in FIG. 4B and FIG. 7, a voltage source 18 is further electrically connected to an end of capacitor $C_{L2}$ (for example, first electrode 132 or the second electrode 134) in the viewing angle changing region R2. Thus, the brightness of the viewing angle changing region R2 is controlled by the second transistor TFT2 and the voltage source 18.

As shown in FIG. 4B and FIG. 7, in the wide mode, no voltage is provided to the first electrode 132 and/or the second electrode 134 and the voltage source 18 does not provide a voltage, so there is no voltage difference between the first electrode 132 and the second electrode 134. Thus, in the wide mode, the viewing angle changing region R2 is dark at all viewing angle. In the narrow mode, when the display region R1 is in the dark state, no voltage is provided to the first electrode 132 and/or the second electrode 134 and the voltage source 18 provides a predetermined voltage, so there is a voltage difference between the first electrode 132 and the second electrode 134 and the viewing angle changing region R2 is in the bright state. In the narrow mode, when the display region R1 is in the bright state, the voltage source 18 provides the predetermined voltage and the same predetermined voltage is provided to the first electrode 132 and/or the second electrode 134, so there is no voltage difference between the first electrode 132 and the second electrode 134 and the viewing angle changing region R2 is in the dark state. Thus, the purpose of low CR in the narrow mode can be achieved, and the CR can be close to 0.2 to 5. Herein, in the narrow mode, the CR of the second light adjusting unit 13' can be calculated by the following equation (III), wherein R1 means the display region R1 and R2 means the viewing angle changing region R2:

CR=(Brightness of $R1$ in the bright state+Brightness of $R2$ in the dark state)/(Brightness of $R1$ in the dark state+Brightness of $R2$ in the bright state) (II).

In FIG. 5 to FIG. 7, the voltage provided to the second transistor TFT2 and/or the voltage provided by the voltage source 18 is not particularly limited, and can be adjusted according to the brightness of the display region R1. For example, the voltage provided to the second transistor TFT2 and/or the voltage provided by the voltage source 18 can be adjusted to make the brightness of the display region R1 in the bright state similar to or the same as the brightness of the viewing angle changing region R2 in the bright state. Thus, the purpose of low CR or CR close to 0.2 to 5 can be achieved.

As shown in FIG. 3, in the electronic device of the present embodiment, the first light adjusting unit 12 is disposed on the second light adjusting unit 13', the second light adjusting unit 13' is disposed between the first polarizer 15 and the second polarizer 16, and the first light adjusting unit 12 disposed between the second polarizer 16 and the third polarizer 17. In another embodiment of the present disclosure, the second light adjusting unit 13' may be disposed between the second polarizer 16 and the third polarizer 17, and the first light adjusting unit 12 may be disposed between the first polarizer 15 and the second polarizer 16; thus, the second light adjusting unit 13' may be disposed on the first light adjusting unit 12. However, the present disclosure is not limited thereto.

As shown in FIGS. 2A, 2B, 4B and 4C, the first substrate 111, the second substrate 116, the third substrate 131 and the fourth substrate 135 may respectively be a non-flexible substrate, a flexible substrate, a thin film or a combination thereof. The material thereof may respectively include quartz, glass, silicon wafer, sapphire, polycarbonate (PC), polyimide (PI), polypropylene (PP), polyethylene terephthalate (PET) or other plastic or polymer material, or a combination thereof, but the present disclosure is not limited thereto. When the first substrate 111, the second substrate 116, the third substrate 131 or the fourth substrate 135 is a thin film, which may be a water barrier film or an encapsulating water barrier film formed by laminated inorganic-organic-inorganic (I-O-I) insulating layers. In some embodiment, the materials of the first substrate 111, the second substrate 116, the third substrate 131 and the fourth substrate 135 may be the same or different; but the present disclosure is not limited thereto.

The material of the common electrode 112, the pixel electrode 114, the first electrode 132 and the second electrode 134 may respectively include a transparent conductive metal oxide such as ITO (indium tin oxide), IZO (indium zinc oxide), ITZO (indium tin zinc oxide), IGZO (indium gallium zinc oxide), AZO (aluminum zinc oxide) or a combination thereof; but the present disclosure is not limited thereto.

The insulating layer 113 may include organic material or inorganic material, for example, silicon oxide, silicon oxynitride, silicon nitride, aluminum oxide, resin, polymer, photoresist, or a combination thereof; but the present disclosure is not limited thereto.

Figure 8:
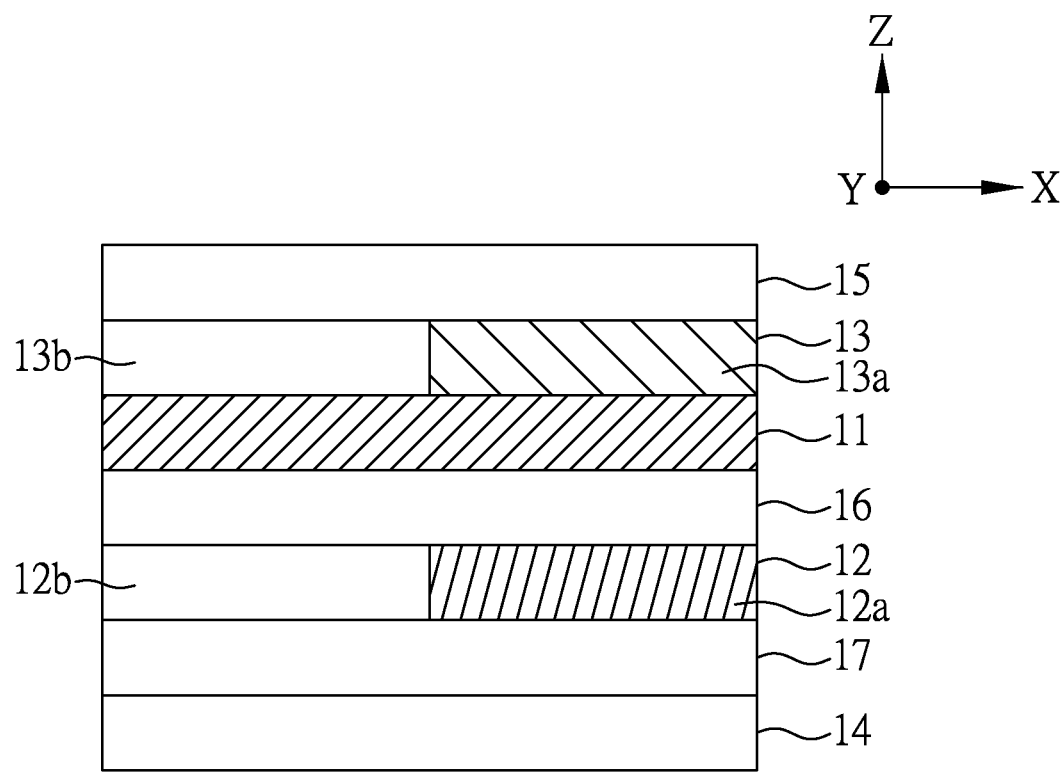
FIG. 8 is a schematic cross-sectional view of an electronic device according to another embodiment of the present disclosure.

FIG. 8 is a schematic cross-sectional view of an electronic device according to another embodiment of the present disclosure. The electronic device of the present embodiment is similar to that shown in FIG. 1, except for the following differences.

As shown in FIG. 8, the second light adjusting unit 13 and the display cell 11 is disposed between the first polarizer 15 and the second polarizer 16, the first light adjusting unit 12 disposed between the second polarizer 16 and the third polarizer 17, the second light adjusting unit 13 is disposed on the display cell 11, and the first light adjusting unit 12 can be disposed below the display cell 11. In addition, the first light adjusting unit 12 comprises a first viewing angle changing area 12a and a first dummy area 12b, and the second light adjusting unit 13 comprises a second viewing angle changing area 13a and a second dummy area 13b. The first viewing angle changing area 12a corresponds to the second viewing angle changing area 13a, and in particular, the second viewing angle changing area 13a the first viewing angle changing area 12a are overlapped. The first dummy area 12b corresponds to the second dummy area 13b, and in particular, the second dummy area 13b overlaps the first dummy area 12b.

Herein, the region with the first dummy area 12b and the second dummy area 13b is in the wide mode, no matter the region with the first viewing angle changing area 12a and the second viewing angle changing area 13a is in the narrow mode or in the wide mode. Herein, the first dummy area 12b of the first light adjusting unit 12 or the second dummy area 13b of the second light adjusting unit 13 may respectively disposed with or without electrodes. In one embodiment of the present disclosure, the first dummy area 12b of the first light adjusting unit 12 and the second dummy area 13b of the second light adjusting unit 13 are disposed with the electrodes to maintain the transmittance of the region with the first dummy area 12b and the second dummy area 13b, but the present disclosure is not limited thereto.

Even not shown in FIG. 1, the first light adjusting unit 12 and the second light adjusting unit 13 may also comprise the first viewing angle changing area 12a and the first dummy area 12b, the second viewing angle changing area 13a and the second dummy area 13b mentioned above.

Figure 9:
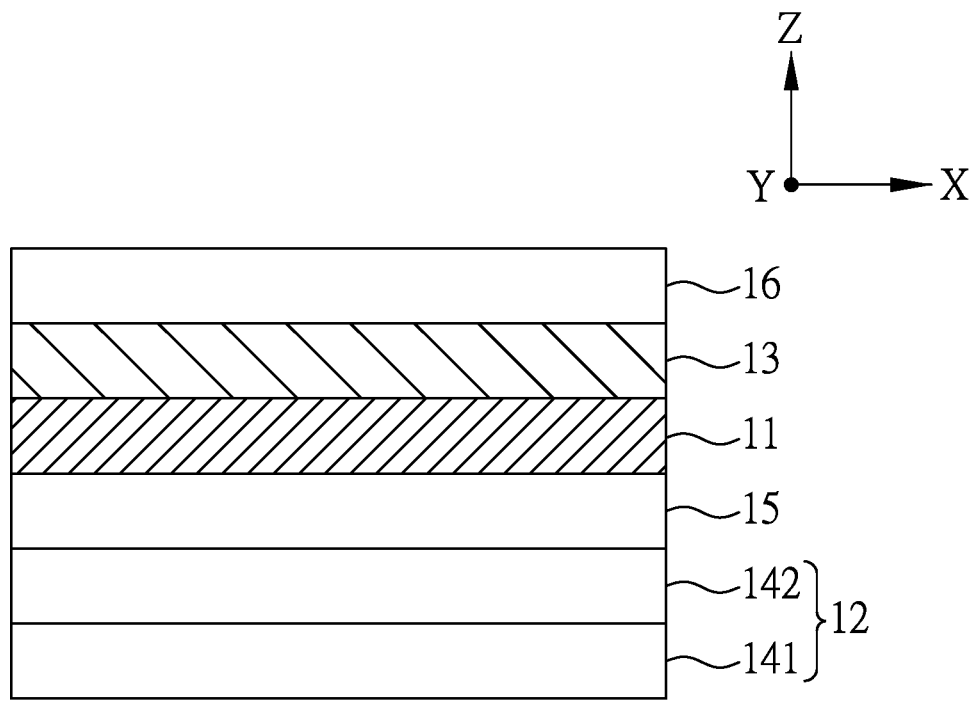
FIG. 9 is a schematic cross-sectional view of an electronic device according to further another embodiment of the present disclosure.

FIG. 9 is a schematic cross-sectional view of an electronic device according to further another embodiment of the present disclosure. The electronic device of the present embodiment comprises: a display cell 11; a first light adjusting unit 12; and a second light adjusting unit 13, wherein the display cell 11, the first light adjusting unit 12 and the second light adjusting unit 13 are at least partially overlapped. The electronic device of the present embodiment further comprises: a first polarizer 15 and a second polarizer 16, wherein the display cell 11 and the second light adjusting unit 13 are disposed between the first polarizer 15 and the second polarizer 16.

As shown in FIG. 9, in the present embodiment, the first light adjusting unit 12 comprises a collimated backlight module 141 and an active diffuser 142 disposed on the collimated backlight module 141, and the display cell 11 is disposed on the active diffuser 142.

In the present embodiment, the collimated backlight module 141 may be a direct-lit backlight module or an edge-lit backlight module. The collimated backlight module 141 may comprise a prism sheet or a louver film to make the light emitting from the collimated backlight module 141 have narrow light dispersion. The beam angle of the collimate light may be, for example, within ±40 degrees, ±30 degrees or ±20 degrees from a normal direction of the display cell 11, but the present disclosure is not limited thereto.

In addition, the active diffuser 142 used herein refers to a diffuser that the haze thereof can be adjusted. Example of the active diffuser 142 may include a polymer dispersed liquid crystal (PDLC) film or a polymer network liquid crystal (PNLC) film. In the wide mode, the active diffuser 142 is adjusted to have high haze, and the active diffuser 142 is in a diffusing state. In the narrow mode, the active diffuser 142 is adjusted to have low haze (for example, close to 0%), and the active diffuser 142 is in a transparent state.

Figure 10:
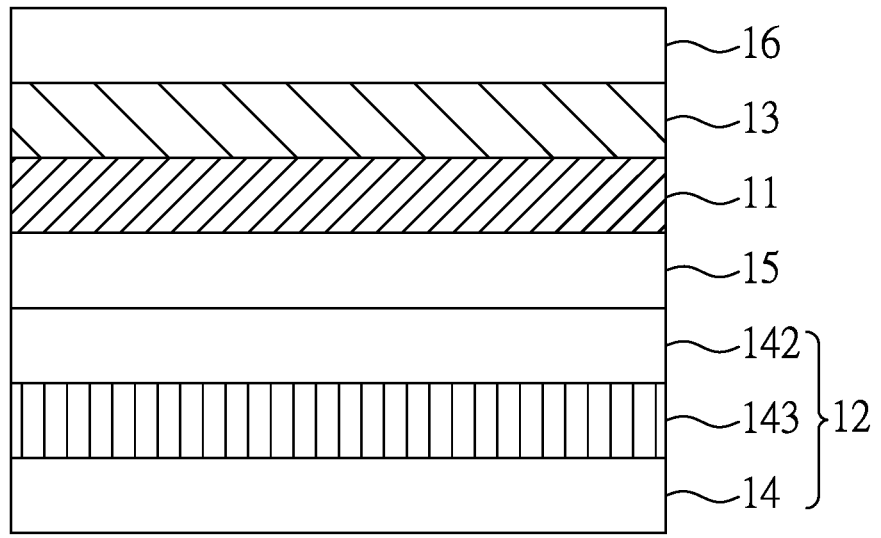
FIG. 10 is a schematic cross-sectional view of an electronic device according to further another embodiment of the present disclosure.

FIG. 10 is a cross-sectional view of an electronic device according to further another embodiment of the present disclosure. The electronic device of the present embodiment is similar to that shown in FIG. 9, except for the first light adjusting unit 12. In the present embodiment, the first light adjusting unit 12 comprises: a non-collimated backlight module 14; a louver film 143 disposed on the non-collimated backlight module 14; and an active diffuser 142 disposed on the louver film 143, wherein the display cell 11 is disposed on the active diffuser 142. The active diffuser 142 used herein is similar to that illustrated above.

The non-collimated backlight module 14 may be a direct-lit backlight module or an edge-lit backlight module. The difference between the non-collimated backlight module 14 and the collimated backlight module 141 is that, the collimated backlight module 141 has narrow light dispersion, but the non-collimated backlight module 14 has wide light dispersion. The beam angle of the light emitting from the non-collimated backlight module 14 may be, for example, within ±90 degrees, ±80 degrees or ±70 degrees from a normal direction of the display cell 11, but the present disclosure is not limited thereto. By using the louver film 143, the light emitting from the non-collimated backlight module 14 can be converted into collimate light.

Figure 11:
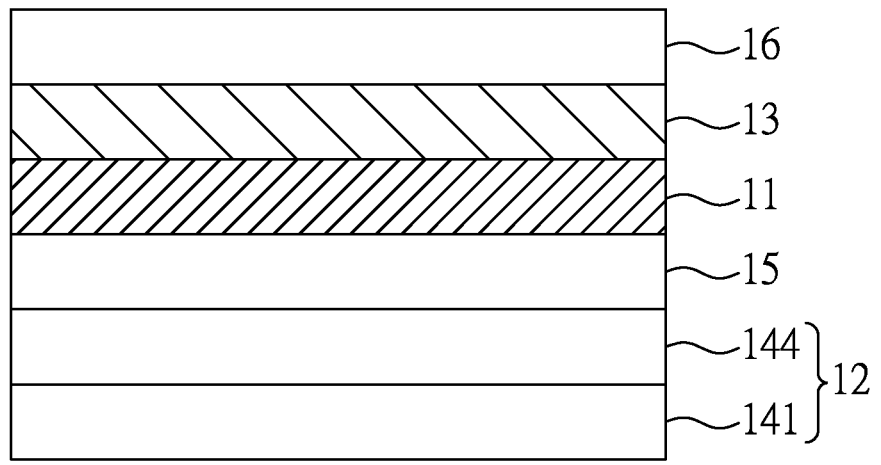
FIG. 11 is a schematic cross-sectional view of an electronic device according to further another embodiment of the present disclosure.

FIG. 11 is a cross-sectional view of an electronic device according to further another embodiment of the present disclosure. The electronic device of the present embodiment is similar to that shown in FIG. 9, except for the first light adjusting unit 12. In the present embodiment, the first light adjusting unit 12 comprises a collimated backlight module 141 and a transparent backlight module 144 disposed on the collimated backlight module 141, and the display cell 11 is disposed on the transparent backlight module 144. Herein, the transparent backlight module 144 has wide light dispersion, and the beam angle of the light emitting from the transparent backlight module 144 may be, for example, within ±90 degrees, ±80 degrees or ±70 degrees from a normal direction of the display cell 11.

The structure of the transparent backlight module 144 can be similar to the non-collimated backlight module. For example, the transparent backlight module 144 may comprise a light guide plate, and plural cavities or air bubbles are formed or embedded in the light guide plate. Because the refractive index of the cavities or the air bubbles is different from the refractive index of the material of the light guide plate, so the light incident into the light guide plate may be refracted, reflected or scattered. Thus the purpose of wide viewing angle can be achieved. Herein, the shapes or the sizes of the cavities or the air bubbles are not particularly limited, and may be adjusted according to the need.

As shown in FIG. 11, in the wide mode, the collimated backlight module 141 is in the off-state and the transparent backlight module 144 is in the on-state. In the narrow mode, the collimated backlight module 141 is in the on-state and the transparent backlight module 144 is in the off-state.

Figure 12:
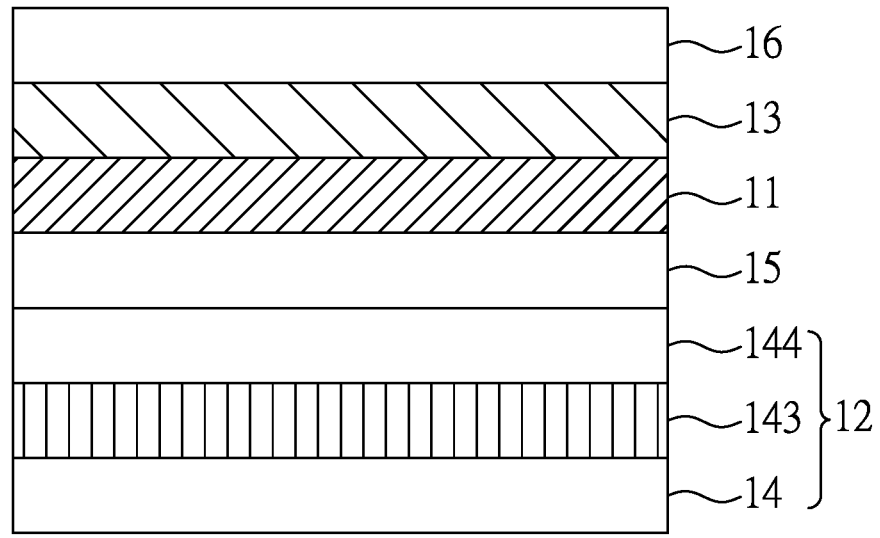
FIG. 12 is a schematic cross-sectional view of an electronic device according to further another embodiment of the present disclosure.

FIG. 12 is a cross-sectional view of an electronic device according to further another embodiment of the present disclosure. The electronic device of the present embodiment is similar to that shown in FIG. 11, except for the first light adjusting unit 12. In the present embodiment, the first light adjusting unit 12 comprises: a non-collimated backlight module 14; a louver film 143 disposed on the non-collimated backlight module 14; and a transparent backlight module 144 disposed on the louver film 143, wherein the display cell 11 is disposed on the transparent backlight module 144. Herein, the transparent backlight module 144 has wide light dispersion.

The non-collimated backlight module 14, the louver film 143 and the transparent backlight module 144 with wide light dispersion are similar to those stated above, and the descriptions thereof are not repeated again.

As shown in FIG. 12, in the wide mode, the non-collimated backlight module 14 is in an off-state and the transparent backlight module 144 is in an on-state. In the narrow mode, the non-collimated backlight module 14 is in an on-state and the transparent backlight module 144 is in an off-state.

Figure 13:
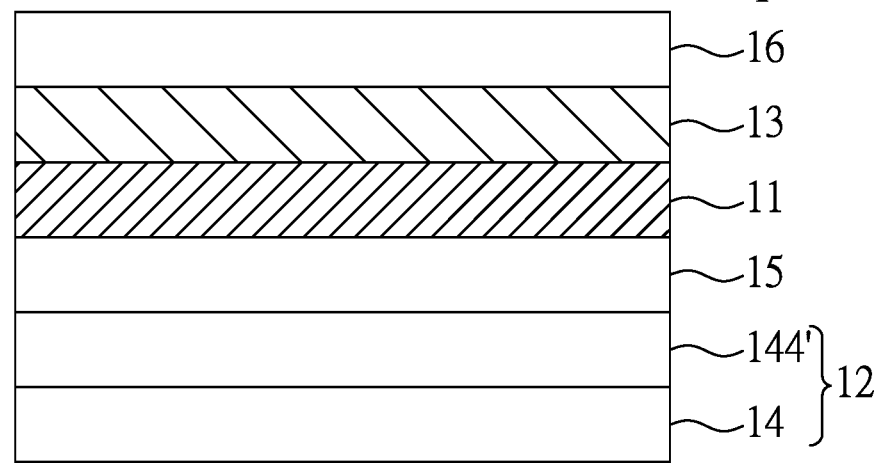
FIG. 13 is a schematic cross-sectional view of an electronic device according to further another embodiment of the present disclosure.

FIG. 13 is a cross-sectional view of an electronic device according to further another embodiment of the present disclosure. The electronic device of the present embodiment is similar to that shown in FIG. 11, except for the first light adjusting unit 12. In the present embodiment, the first light adjusting unit 12 comprises: a non-collimated backlight module 14; and a transparent backlight module 144' disposed on the non-collimated backlight module 14, wherein the display cell 11 is disposed on the transparent backlight module 144'. Herein, the transparent backlight module 144' has narrow light dispersion, and the beam angle of the light emitting from the transparent backlight module 144 may be, for example, within ±40 degrees, ±30 degrees or ±20 degrees from a normal direction of the display cell 11.

As shown in FIG. 13, in the wide mode, the non-collimated backlight module 14 is in the on-state, and the transparent backlight module 144' is in the off-state. In the narrow mode, the non-collimated backlight module 14 is in the off-state, and the transparent backlight module 144 is in the on-state.

In the electronic devices shown in FIG. 9 to FIG. 13, the display cell 11, the second light adjusting unit 13, the first polarizer 15 and the second polarizer 16 are similar to those stated above, and are not repeated again. In addition, in other embodiments of the present disclosure, the display cell 11 and the second light adjusting unit 13 of the electronic devices shown in FIG. 9 to FIG. 13 together may be replaced by the second light adjusting unit 13' illustrated above.

In addition, in other embodiments of the present disclosure, the first light adjusting unit 12 of the electronic devices shown in FIG. 9 to FIG. 13 may comprise a first viewing angle changing area and a first dummy area (not shown in the figure), and the second light adjusting unit 13 comprises a second viewing angle changing area 13a and a second dummy area 13b (similar to those shown in FIG. 8). The first viewing angle changing area corresponds to the second viewing angle changing area 13a, and in particular, the second viewing angle changing area 13a overlaps the first viewing angle changing area. The first dummy area corresponds to the second dummy area 13b, and in particular, the second dummy area 13b overlaps the first dummy area. Herein, the region with the first dummy area and the second dummy area 13b is in the wide mode, no matter the region with the first viewing angle changing area and the second viewing angle changing area 13a is in the narrow mode or in the wide mode.

In the present disclosure, the features in different embodiments of the present disclosure can be mixed to form another embodiment without departing from the spirit and scope of the disclosure as hereinafter claimed.

Although the present disclosure has been explained in relation to its embodiment, it is to be understood that many other possible modifications and variations can be made without departing from the spirit and scope of the disclosure as hereinafter claimed.

What is claimed is:

1. An electronic device, comprising:
a first light adjusting unit, comprising:
a non-collimated backlight module;
a transparent backlight module disposed on the non-collimated backlight module, wherein the transparent backlight module comprises a direct-lit backlight module or an edge-lit backlight module;
a louver film disposed between the non-collimated backlight module and the transparent backlight module, wherein the louver film is configured to collimate a light emitting from the non-collimated backlight module;
a display cell disposed on the transparent backlight module; and
a second light adjusting unit disposed on the display cell and comprising:
a first substrate;
a second substrate opposite to the first substrate; and
a display medium layer disposed between the first substrate and the second substrate,
wherein in case of a narrow mode, the non-collimated backlight module is in an on-state, and the transparent backlight module is in an off-state,
wherein in case of a wide mode, the transparent backlight module is in an on-state,
wherein a viewing angle of the electronic device in the narrow mode is less than a viewing angle of the electronic device in the wide mode,
wherein the first light adjusting unit comprises a first viewing angle changing area and a first dummy area, the second light adjusting unit comprises a second viewing angle changing area and a second dummy area, and the second dummy area overlaps the first dummy area in a plan view, and
wherein a region with the first dummy area and the second dummy area is in the wide mode with light transmittance through it no matter a region with the first viewing angle changing area and the second viewing angle changing area is in the narrow mode or in the wide mode.

2. The electronic device of claim 1, further comprising a first polarizer and a second polarizer, wherein the display cell is disposed between the first polarizer and the second polarizer.

3. The electronic device of claim 1, wherein the narrow mode is a privacy mode.

4. The electronic device of claim 1, wherein the non-collimated backlight module comprises a light source.

5. The electronic device of claim 1, wherein the transparent backlight module comprises a light source.

6. The electronic device of claim 1, wherein the transparent backlight module comprises a light guide plate.

7. The electronic device of claim 6, wherein plural cavities or air bubbles are formed or embedded in the light guide plate.

* * * * *